(12) United States Patent
Jones

(10) Patent No.: US 10,619,451 B2
(45) Date of Patent: Apr. 14, 2020

(54) REDUNDANT BALANCE LINE OPERATING SYSTEM

(71) Applicant: Brett Cullen Jones, Broken Arrow, OK (US)

(72) Inventor: Brett Cullen Jones, Broken Arrow, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 270 days.

(21) Appl. No.: 15/874,558

(22) Filed: Jan. 18, 2018

(65) Prior Publication Data
US 2019/0218884 A1   Jul. 18, 2019

(51) Int. Cl.
*E21B 34/10* (2006.01)
*F15B 11/16* (2006.01)
*F15B 15/14* (2006.01)
*E21B 34/00* (2006.01)

(52) U.S. Cl.
CPC .............. *E21B 34/10* (2013.01); *F15B 11/16* (2013.01); *F15B 15/1452* (2013.01); *E21B 2034/005* (2013.01)

(58) Field of Classification Search
CPC .... E21B 2034/005; E21B 34/10; F15B 11/16; F15B 15/145
See application file for complete search history.

(56) References Cited

U.S. PATENT DOCUMENTS

2015/0129196 A1   5/2015   Jones et al.

*Primary Examiner* — Caroline N Butcher
(74) *Attorney, Agent, or Firm* — Cantor Colburn LLP

(57) ABSTRACT

A redundant balance line operating system including first and second control lines, first and second balance lines, a first and second compensators and first and second actuators, the components being hydraulically connected to operate redundantly and to fail safe.

12 Claims, 2 Drawing Sheets

REDUNDANT BALANCE LINE OPERATING SYSTEM

BACKGROUND

Hydraulic actuation of tools has been a mainstay in mechanical systems. This is particularly true in industries where actuations must occur many hundreds to thousands of feet from an operator such as in the resource exploration and recovery industries. Many times, a simple hydraulic circuit will be sufficient but there are times in many industries where redundant systems are not only preferred but may also be required by law. Considerations of how to efficiently actuate tools while maintaining redundancy can be complicated. Add to this the requirement in some instances, such as subsurface safety valves, to be fail safe, and the complications multiply.

While there are current systems that provide redundancy and fail safe operation, each has drawbacks in terms of cost or complexity. In some cases there is reliance on components or subsystems that increase cost or maintenance regimes or indeed dictate a shorter working lifespan of the system as a whole. The industry would welcome alternative systems that reduce these drawbacks.

SUMMARY

A redundant balance line operating system including first and second control lines, first and second balance lines, a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line, a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line, a first actuator having a first actuator piston therein defining a first actuator control line chamber connected to the first control line and a first actuator balance line chamber connected to the first balance line, and a second actuator having a second actuator piston therein defining a second actuator control line chamber connected to the second control line and a second actuator balance line chamber connected to the second balance line.

A subsurface safety valve suited to a hydrocarbon well and having a flapper, power spring and flow tube, the valve includes a redundant balance line operating system including first and second control lines, first and second balance lines, a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line, a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line, a first actuator having a first actuator piston therein defining a first actuator control line chamber connected to the first control line and a first actuator balance line chamber connected to the first balance line; and a second actuator having a second actuator piston therein defining a second actuator control line chamber connected to the second control line and a second actuator balance line chamber connected to the second balance line.

A resource recovery borehole system including a redundant balance line operating system including first and second control lines, first and second balance lines, a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line, a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line, a first actuator having a first actuator piston therein defining a first actuator control line chamber connected to the first control line and a first actuator balance line chamber connected to the first balance line, and a second actuator having a second actuator piston therein defining a second actuator control line chamber connected to the second control line and a second actuator balance line chamber connected to the second balance line.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
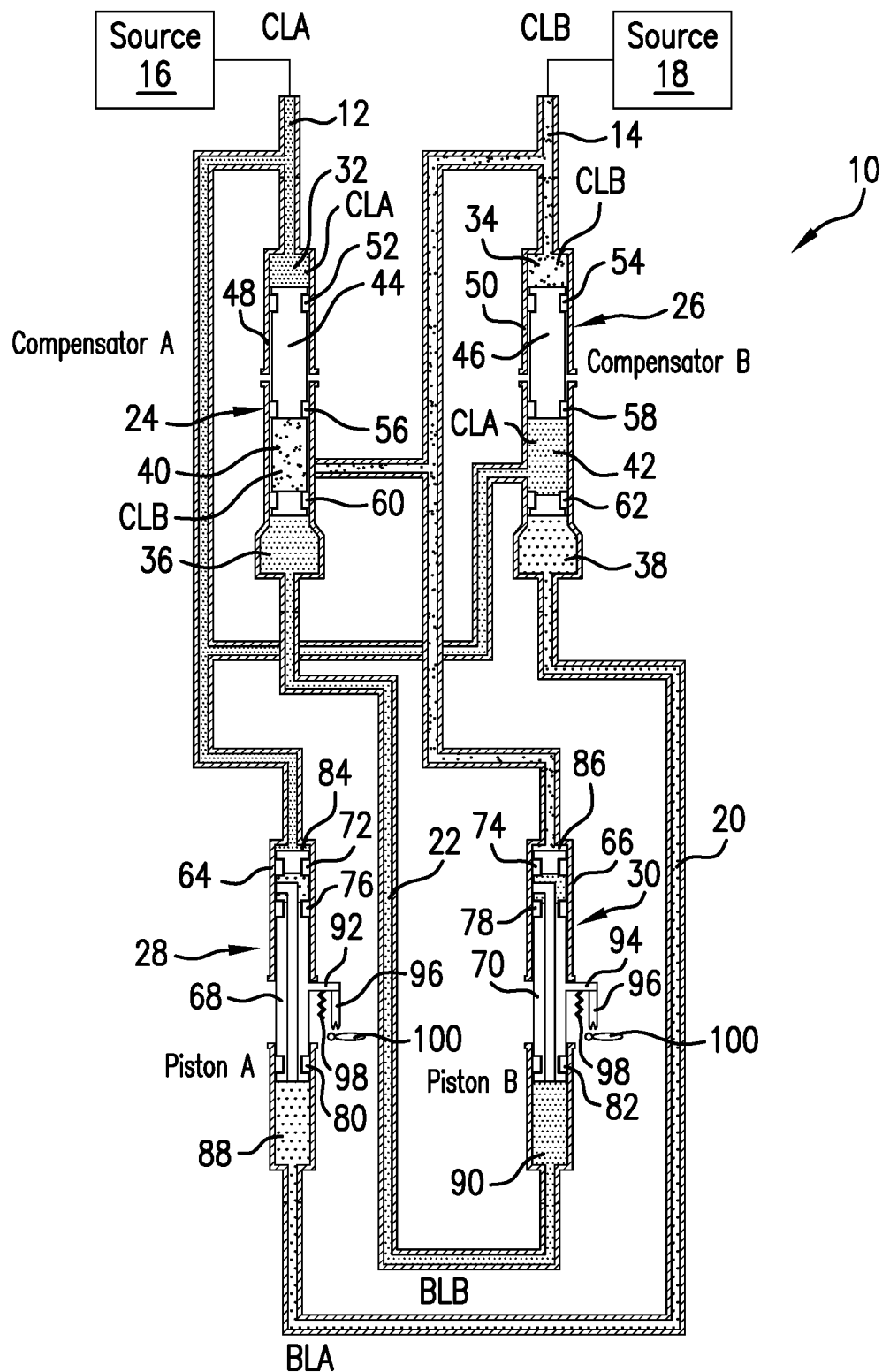
FIG. 1 is a schematic view of a redundant balance line operating system in a normal operating condition.

Referring to FIG. 1, a redundant balance line operating system 10 in a normal operating condition is illustrated. The system is thus ready to operate and is in a condition without a failure mode. The system allows for retained functionality even with a number of different failure modes discussed below that might be in effect. The system also will fail safe in the event of a failure mode beyond the system's capability to manage and still operate.

The system includes two (first and second) control lines 12 and 14. This will be recognized by those of skill in the art as fewer control lines than would be required in the prior art to achieve the functionality obtained by the system 10 and hence this number of control lines represents a first benefit of the invention. An introduction of all of the components of the system 10 before discussion of their interaction will simplify the path to understanding. The first and second control lines have a source 16 and 18, respectively, that may be independent though it should be understood that the source may also be the same source but with a controller to allow an operator to apply pressure to one or the other control line (but not both at the same time). Each control line 12 and 14 includes multiple hydraulic connections for the application of applied pressure. The system 10 further contains first and second balance lines 20 and 22 whose function will become apparent below. Yet still the system contains first and second compensators 24 and 26 and first and second actuators 28 and 30 also discussed further below.

The first and second compensators 24 and 26 each possess a control line chamber 32, 34; a balance line chamber 36, 38; and a conditional dead head chamber 40, 42 (all respectively). In an embodiment, the chambers identified are defined by a compensator piston 44, 46 slidably sealed within a housing 48, 50 with seals 52, 54; 56, 58; and 60, 62.

The first and second actuators 28 and 30, in an embodiment, comprise a housing 64, 66; an actuator piston 68, 70 and seals 72, 74; 76, 78; and 80, 82. The seals, along with the housing 64, 66 and the actuator piston 68, 70 define an actuator control line chamber 84, 86 and an actuator balance line chamber 88, 90. The actuator pistons also include a mechanical interconnection component 92, 94 that is intended to connect the system to a tool. It is to be appreciated that many different hydraulically actuated tools may benefit from the use of the redundant balance line operating system disclosed herein. In an exemplary embodiment only, the tool is a subsurface safety valve having a flow tube 96, a power spring 98 and a flapper 100 and the component 92, 94 will connect to the flow tube 96 thereof in known ways (and be biased by the power spring 98 in known ways) The configuration of the actuator itself including the component 92, 94 will be recognized by those of skill in the art.

Upon higher level review of FIG. 1, it will be apparent that the system 10 internally mirrors itself. Each control line 12 and 14 is hydraulically connected to several things. Namely, control line 12 is connected to first compensator control line chamber 32, second compensator conditional dead head chamber 42 and actuator control line chamber 84 while second control line 14 is hydraulically connected to second compensator control line chamber 34, first compensator conditional dead head chamber 40 and actuator control line chamber 86. The same mirroring is true for the balance lines 20 and 22. The first balance line 20 is hydraulically connected to the second compensator balance line chamber 38 and the first actuator balance line chamber 88 while the second balance line 22 is hydraulically connected to the first compensator balance line chamber 36 and the second actuator balance line chamber 90.

In operation, it is to be appreciated that pressuring upon either control line 12 or 14 (but not both at the same time) in a failure-mode free condition will result in the actuation of the connected tool. Focusing upon the first control line 12 for example, pressure therein will increase the pressure in compensator control line chamber 32 second compensator conditional dead head chamber 42 and actuator control line chamber 84. The conditional dead head chamber 42 cannot result in movement due to balanced pressures through the system and the first compensator piston movement is subject to piston 70 being immovable against its housing 66 and so cannot move. Therefore the only movement potential is in the first actuator piston, which will actuate the tool connected thereto (hereinafter termed the "valve" for simplicity) and second compensator piston movement to allow fluid from balance line 20 to displace in order to allow the piston 68 to move. The mirror of the above occurs if the control line 14 is pressured instead of control line 12 and the result is the same. The valve will open. The magic of the system 10 becomes evident during failure modes.

Potential failure modes for any kind of hydraulic system center around leaks past seals or past components, which cause the system to not operate as designed. With the system 10, these failure modes are addressed uniquely to maintain function for more of the potential failure modes and to inevitably fail safe if the failures extend beyond the capability of the system to manage. All of the adaptive action of the system is automatic.

Potential failure modes include control lines 12 or 14 experiencing unintended increased or decreased pressure; balance lines 20 or 22 experiencing unintended increased or decreased pressure and unintended hydraulic communications between either control line and its associated balance line 12/20 and 14/22. In any of these modes, the side affected will be overcome by the power spring and fail closed while the mirrored side will remain operational and can be used to open the valve.

For example, if pressure in control line 12 increases beyond working tolerance (since an increased pressure condition in one of control line 12 or 14 within working tolerance is inherent in the system being used to open the valve), then seal 72 could fail. This will cause fluid pressure to equalize across piston 68 and the power spring will close the valve. If pressure is lost in control line 12, the valve will also automatically close. The mirror is true for control line 14. Alternatively, if the balance line 20 experiences increased pressure, which might occur in for example in a borehole tool due to a failure of seal 80 allowing higher tubing pressure to access balance line 20, the valve automatically closes because the pressure differential across piston 68 will urge the piston in the close direction rather than in the open direction, this is pursuant to a greater pressure in chamber 88 than in chamber 84. In the case of pressure loss in a balance line, the system 10 will correct itself and remain functional as discussed in greater detail with reference to FIG. 2 below.

Figure 2:
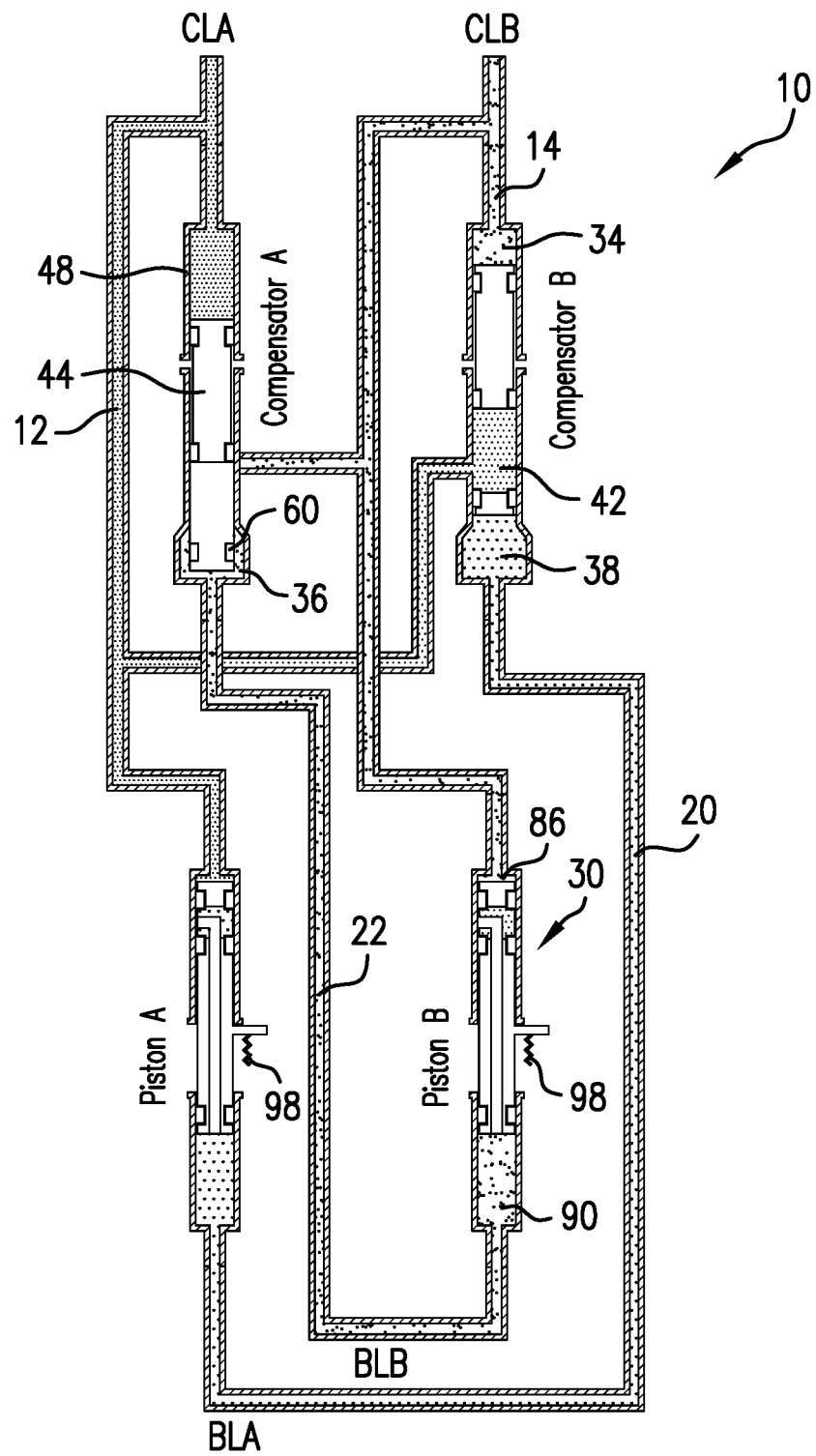
FIG. 2 is the schematic view of FIG. 1 illustrating one failed safe failure mode.

Referring to FIG. 2, the case of a loss of pressure in balance line 22 is illustrated. It will be appreciated that control line 14 pressure is found in compensator conditional dead head chamber 40 (see FIG. 1) and is balanced by pressure in compensator balance chamber 36 (see FIG. 1). When pressure is lost in balance line 22 however there is no longer a balance across seal 60 but rather a higher pressure from control line 12. This will cause the compensator piston 44 to move toward compensator balance chamber 36 until the seal 60 is unsealed from the housing 48 and hydraulically communicates the former compensator conditional dead head chamber 40 with the former compensator balance line chamber 36 whereafter the pressure in the control line 14 and the balance line 22 are equalized. At this point the actuator 30 is inoperable since pressure in chamber 86 and chamber 90 are equal. The power spring 98 will dictate valve position at this point and this part of the system is failed closed. This sequence is mirrored for the other side of system 10 if the loss of pressure in the balance line 20 had been experienced instead.

It is to be appreciated that although the seal 60 (or the seal 62) are used as exemplary ways to communicate the chamber 40 with the chamber 36 (or chamber 42 with chamber 38), other means are also contemplated such as a pathway through the housing 48 that can bypass the seal once the seal has moved far enough within the housing 48, etc. The point is simply that the pressure from the control line and the pressure in that control line's balance line must become communicated and thereby equal to remove that side of the system from operation in the event of a failure requiring such result. This will, as noted, leave the other side of system 10 functional.

It will be appreciated by those of skill in the resource recovery arts that when the system 10 is used for a downhole operation, pressure losses or gains may come from communications across seals with the tubing or the annulus of a downhole installation. These include: annulus to control line 12; annulus to balance line 20; tubing to balance line 20; and annulus to control line 14; annulus to balance line 22; tubing to balance line 22. There is no tubing to control line single failure mode although with multiple failure modes, it is possible to communicate tubing to control lines. Even in these conditions, however, the system as taught herein fails safe. The need to provide a fail-safe configuration due to the eventualities and potentials of communications with the tubing or annulus is known to those of skill in the art.

Set forth below are some embodiments of the foregoing disclosure:

Embodiment 1

A redundant balance line operating system including first and second control lines, first and second balance lines, a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line, a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line, a first actuator having a first actuator piston therein defining a first actuator control line chamber connected to the first control line and a first actuator balance line chamber connected to the first balance line, and a second actuator having a second actuator piston therein defining a second actuator control line chamber connected to the second control line and a second actuator balance line chamber connected to the second balance line.

Embodiment 2

The system as in any prior embodiment wherein each compensator includes a compensator piston therein having compensator seals thereon.

Embodiment 3

The system as in any prior embodiment wherein the compensator seals are positioned to define the compensator control line chamber, the compensator balance line chamber and the compensator conditional dead head chambers.

Embodiment 4

The system as in any prior embodiment wherein the actuator pistons include a mechanical interconnect configured to mechanically connect the actuator pistons to a tool to be actuated.

Embodiment 5

The system as in any prior embodiment wherein the first and second compensator balance line chambers are configured with at least a portion having a diameter to sealably mate with compensator pistons therein.

Embodiment 6

The system as in any prior embodiment wherein the first and second compensator balance line chambers further include a feature to communicate the compensator balance line chambers to the compensator conditional dead head chambers.

Embodiment 7

The system as in any prior embodiment wherein the feature is a fluid pathway.

Embodiment 8

The system as in any prior embodiment wherein the compensator piston includes a seal between the compensator balance line chamber and the compensator conditional dead head chamber and the feature is an enlargement of the compensator balance line chamber dimensionally such that the seal between the compensator balance line chamber and the compensator conditional dead head chamber is defeated.

Embodiment 9

The system as in any prior embodiment wherein the seal is moved out of a seal bore of the compensator.

Embodiment 10

A subsurface safety valve suited to a hydrocarbon well and having a flapper, power spring and flow tube, the valve includes a redundant balance line operating system including first and second control lines, first and second balance lines, a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line, a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line, a first actuator having a first actuator piston therein defining a first actuator control line chamber connected to the first control line and a first actuator balance line chamber connected to the first balance line; and a second actuator having a second actuator piston therein defining a second actuator control line chamber connected to the second control line and a second actuator balance line chamber connected to the second balance line.

Embodiment 11

A resource recovery borehole system including a redundant balance line operating system including first and second control lines, first and second balance lines, a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line, a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line, a first actuator having a first actuator piston therein defining a first actuator control line chamber connected to the first control line and a first actuator balance line chamber connected to the first balance line, and a second actuator having a second actuator piston therein defining a second actuator control line chamber connected to the second control line and a second actuator balance line chamber connected to the second balance line.

Embodiment 12

The system as in any prior embodiment further comprising a subsurface safety valve in actuable contact with the redundant balance line operating system.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A redundant balance line operating system comprising:
    first and second control lines;
    first and second balance lines;
    a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line;
    a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line;
    a first actuator having a first actuator piston therein defining a first actuator control line chamber connected to the first control line and a first actuator balance line chamber connected to the first balance line; and
    a second actuator having a second actuator piston therein defining a second actuator control line chamber connected to the second control line and a second actuator balance line chamber connected to the second balance line.

2. The system as claimed in claim 1 wherein each compensator includes a compensator piston therein having compensator seals thereon.

3. The system as claimed in claim 2 wherein the compensator seals are positioned to define the compensator control line chamber, the compensator balance line chamber and the compensator conditional dead head chambers.

4. The system as claimed in claim 1 wherein the actuator pistons include a mechanical interconnect configured to mechanically connect the actuator pistons to a tool to be actuated.

5. The system as claimed in claim 1 wherein the first and second compensator balance line chambers are configured with at least a portion having a diameter to sealably mate with compensator pistons therein.

6. The system as claimed in claim 5 wherein the first and second compensator balance line chambers further include a feature to communicate the compensator balance line chambers to the compensator conditional dead head chambers.

7. The system as claimed in claim 6 wherein the feature is a fluid pathway.

8. The system as claimed in claim 6 wherein the compensator piston includes a seal between the compensator balance line chamber and the compensator conditional dead head chamber and the feature is an enlargement of the compensator balance line chamber dimensionally such that the seal between the compensator balance line chamber and the compensator conditional dead head chamber is defeated.

9. The system as claimed in claim 8 wherein the seal is moved out of a seal bore of the compensator.

10. A subsurface safety valve suited to a hydrocarbon well and having a flapper, power spring and flow tube, the valve comprising:
   a redundant balance line operating system including:
   first and second control lines;
   first and second balance lines;
   a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line;
   a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line;
   a first actuator having a first actuator piston therein defining a first actuator control line chamber connected to the first control line and a first actuator balance line chamber connected to the first balance line; and
   a second actuator having a second actuator piston therein defining a second actuator control line chamber connected to the second control line and a second actuator balance line chamber connected to the second balance line.

11. A resource recovery borehole system including:
   a redundant balance line operating system including:
   first and second control lines;
   first and second balance lines;
   a first compensator having a first compensator control line chamber, a first compensator balance line chamber and a first compensator conditional dead head chamber, the first compensator control line chamber being connected to the first control line, the first compensator balance line chamber being connected to the second balance line and the first compensator conditional dead head chamber being connected to the second control line;
   a second compensator having a second compensator control line chamber, a second compensator balance line chamber and a second compensator conditional dead head chamber, the second compensator control line chamber being connected to the second control line, the second compensator balance line chamber being connected to the first balance line and the second compensator conditional dead head chamber being connected to the first control line;
   a first actuator having a first actuator piston therein defining a first actuator control line chamber connected to the first control line and a first actuator balance line chamber connected to the first balance line; and
   a second actuator having a second actuator piston therein defining a second actuator control line chamber connected to the second control line and a second actuator balance line chamber connected to the second balance line.

12. The system as claimed in claim 11 further comprising a subsurface safety valve in actuable contact with the redundant balance line operating system.

* * * * *